(12) United States Patent
Kurokawa et al.

(10) Patent No.: US 10,719,471 B2
(45) Date of Patent: Jul. 21, 2020

(54) STORAGE SYSTEM AND BACKEND CONSTRUCTION METHOD FOR STORAGE SYSTEM HAVING SWITCH THAT IS LOGICALLY PARTITIONED INTO MULTIPLE PARTITIONS

(71) Applicant: HITACHI, LTD., Tokyo (JP)

(72) Inventors: Midori Kurokawa, Tokyo (JP); Yuta Yamasaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/330,783

(22) PCT Filed: Mar. 24, 2017

(86) PCT No.: PCT/JP2017/011969
§ 371 (c)(1),
(2) Date: Mar. 6, 2019

(87) PCT Pub. No.: WO2018/173245
PCT Pub. Date: Sep. 27, 2018

(65) Prior Publication Data
US 2019/0197000 A1    Jun. 27, 2019

(51) Int. Cl.
| G06F 13/40 | (2006.01) |
|---|---|
| G06F 9/50 | (2006.01) |
| G06F 3/06 | (2006.01) |
| G06F 11/22 | (2006.01) |
| G06F 16/22 | (2019.01) |

(52) U.S. Cl.
CPC ........ *G06F 13/4022* (2013.01); *G06F 3/0607* (2013.01); *G06F 3/0644* (2013.01); *G06F 3/0679* (2013.01); *G06F 9/5077* (2013.01); *G06F 11/2221* (2013.01); *G06F 16/2272* (2019.01); *G06F 2213/0026* (2013.01)

(58) Field of Classification Search
CPC combination set(s) only.
See application file for complete search history.

(56) References Cited

U.S. PATENT DOCUMENTS

| 8,756,360 B1 | 6/2014 | Richard |
| 9,141,571 B2 | 9/2015 | Subramaniyan et al. |
| 2006/0242330 A1 | 10/2006 | Torudbakken et al. |

(Continued)

OTHER PUBLICATIONS

International Search Report of PCT/JP2017/011969 dated Jun. 13, 2017.

*Primary Examiner* — Raymond N Phan
(74) *Attorney, Agent, or Firm* — Mattingly & Malur, PC

(57) ABSTRACT

Provided is a storage system in which a switch is logically divided into a plurality of partitions including: a plurality of first partitions which are coupled to a plurality of master devices of a processor unit and to which none of storage devices are coupled; and one or more second partitions which are coupled to a plurality of storage devices and which are not coupled to the processor unit. The switch has an address conversion function which is a function for enabling transfer between different partitions. A virtual master device is provided to each of the second partitions. With respect to each of the second partitions, the virtual master device in the second partition executes initial setting with respect to each of all storage devices coupled to the second partition.

13 Claims, 10 Drawing Sheets

(56) References Cited

U.S. PATENT DOCUMENTS

2010/0165874 A1\* 7/2010 Brown ................ G06F 13/4022
370/254
2014/0351654 A1\* 11/2014 Zhang ................ G06F 11/2221
714/43

\* cited by examiner

Comparative example

FIG. 4

Drive mounting state management table
143

| Drive# 401 | Mounting state 402 | Link state 403 |
|---|---|---|
| 0 | 1 | 1 |
| 1 | 1 | 1 |
| 2 | 0 | 0 |
| ... | ... | ... |

FIG. 5

Drive setting state management table
144

| Drive# 501 | Completion state 502 | Result state 503 |
|---|---|---|
| 0 | 0 | 0 |
| 1 | 0 | 0 |
| 2 | 1 | 1 |
| ... | ... | ... |

FIG. 6

Drive initial setting management table
145

| Drive# 601 | Bus# 602 | Device# 603 | Function# 604 | Base address register 605 | MSI table register 606 |
|---|---|---|---|---|---|
| 0 | | | | | |
| 1 | | | | | |
| 2 | | | | | |
| ... | ... | ... | ... | ... | ... |

FIG. 7

Path management table
146

| Path# 701 | Data transfer amount [MB/s] 702 | Link state 703 | Weight 704 |
|---|---|---|---|
| 0 | 6000 | 1 | 1 |
| 1 | 4000 | 1 | 2 |

FIG. 8

Address conversion table
147

| Tag# 801 | Path# 802 | Actual memory address 803 | Command designation memory address 804 |
|---|---|---|---|
| 1 | 1 | 0x00000000_00040000 | 0x0000A000_00040000 |
| 2 | 0 | 0x00000000_00080000 | 0x0000B000_00080000 |
| ... | ... | ... | ... |

FIG. 9

Command management table
148

| Tag# 901 | Drive# 902 | Length 903 | Command designation memory address 904 | Drive address 905 |
|---|---|---|---|---|
| 1 | 0 | 0x20000 | 0x0000A000_00040000 | 0x00005000 |
| 2 | 1 | 0x10000 | 0x0000B000_00080000 | 0x00001000 |
| ... | ... | ... | ... | ... |

FIG. 16

Entire address management table
1600

| CTL# 1601 | Path# 1602 | Start address 1603 | Size 1604 |
|---|---|---|---|
| 0 | 0 | 0x0000A000_00000000 | 0x00001000_00000000 |
| 0 | 1 | 0x0000B000_00000000 | 0x00001000_00000000 |
| 1 | 0 | 0x0000C000_00000000 | 0x00001000_00000000 |
| 1 | 1 | 0x0000D000_00000000 | 0x00001000_00000000 |

FIG. 17

First switch address management table
1700A

| Path# 1701A | Start address 1702A | Size 1703A |
|---|---|---|
| 0 | 0x0000A000_00000000 | 0x00001000_00000000 |
| 1 | 0x0000B000_00000000 | 0x00001000_00000000 |

FIG. 18

Second switch address management table
1700B

| Path# 1701B | Start address 1702B | Size 1703B |
|---|---|---|
| 0 | 0x0000C000_00000000 | 0x00001000_00000000 |
| 1 | 0x0000D000_00000000 | 0x00001000_00000000 |

STORAGE SYSTEM AND BACKEND CONSTRUCTION METHOD FOR STORAGE SYSTEM HAVING SWITCH THAT IS LOGICALLY PARTITIONED INTO MULTIPLE PARTITIONS

TECHNICAL FIELD

The present invention generally relates to system construction of a storage system.

BACKGROUND ART

A storage system having a plurality of storage devices (hereinafter, referred to as drives) mounted thereon has been known. An SSD (Solid State Drive) is an example of a drive.

NVMe (NVM (Non-Volatile Memory) Express) has been known as a communication interface (protocol) for coupling drives.

It is therefore expected that NVMe-SSD is employed as an SSD mounted on a storage system. When the NVMe-SSD is employed, PCIe (PCI-Express) is employed as a communication interface between a processor and an SSD. Specifically, a processor and an NVMe-SSD may be coupled via a PCIe switch. PTL 1 to PTL 3 have been known as technologies related to PCIe switches.

CITATION LIST

Patent Literature

[PTL 1] US 2006/0242330
[PTL 2] U.S. Pat. No. 8,756,360
[PTL 3] U.S. Pat. No. 9,141,571

SUMMARY OF INVENTION

Technical Problem

PCIe is an example of a communication interface in which the number of master devices that can be present in the same space is defined. In PCIe, generally, a root complex is an example of a master device, an endpoint is an example of a slave device, and a domain is an example of a space. In PCIe, only a single root complex can be present in the same domain, and one or more endpoints can be coupled to the single root complex.

A multi-root PCIe switch which is a PCIe switch couplable to multi-roots (a plurality of root complexes) has been known.

In a storage system, when a multi-root PCIe switch is employed as a PCIe switch, a plurality of NVMe-SSDs (endpoints) and a plurality of root complexes (for example, ports) included in a processor unit (one or more processors) are coupled to the multi-root PCIe switch. In this case, a configuration including Configurations A and B below may be employed as a configuration of a backend (between a processor unit and an NVMe-SSD).

(Configuration A)
A multi-root PCIe switch is logically partitioned into a plurality of partitions (domains). A root complex of a processor unit and one or more NVMe-SSDs are coupled to each partition. This is to maintain a relation that one root complex is present in one domain.

(Configuration B)
NTB (Non Transparent Bridge) is mounted on a multi-root PCIe switch. This is to allow each root complex to access an NVMe-SSD coupled to a partition different from a partition to which the root complex is coupled.

However, it is considered that a backend configuration including Configurations A and B has Problems X to Z below.

(Problem X)
A processor unit needs to perform initial setting of each of the NVMe-SSDs coupled to the multi-root PCIe switch via a path coupled to a partition to which the NVMe-SSD is coupled. Therefore, if the path is in a non-coupling state or a failure state, it is not possible to perform initial setting of the NVMe-SSD.

(Problem Y)
There is a limitation on the number of devices (for example, the number of BDF (bus number, device number, and function number)) that a processor unit can use. In general, a PCI device (for example, a communication interface device) other than a multi-root PCIe switch is also coupled to the processor unit. Therefore, even if the same number of NVMe-SSDs as the number of devices that the processor unit can use are coupled to the multi-root PCIe switch, the processor unit cannot access all NVMe-SSDs.

(Problem Z)
The setting of backend configuration (for example, the setting related to NVMe-SSD) is complex (for example, the setting depends on increase/decrease in number of paths that couple the processor unit and the multi-root PCIe switch). Specifically, it is necessary to determine which partition, an NVMe-SSD is to be coupled to, and which partition, switching is to be performed to if a certain failure occurs, for example.

At least one of Problems X to Z is not limited to PCIe but may occur when another type of communication interface in which the number of master devices that can be present in the same space is employed as a communication interface (of backend) between a processor unit and a drive.

Solution to Problem

A storage system includes: a switch that relays communication according to a communication interface in which the number of master devices can be present in the same partition is defined; a plurality of storage devices coupled to the switch; a memory unit that includes one or more memories; and a processor unit which is one or more processors coupled to the memory unit and the switch and has a plurality of master devices. The switch is logically partitioned into a plurality of partitions. The plurality of partitions include a plurality of first partitions and one or more second partitions. The plurality of master devices of the processor unit are coupled to the plurality of first partitions via a plurality of paths, and the plurality of storage devices are not coupled to the plurality of first partitions. The plurality of storage devices are coupled to the one or more second partitions, and the processor unit is not coupled to the one or more second partitions. The switch has an address conversion function which is a function of enabling transfer between different partitions. A virtual master device is provided to each of the one or more second partitions. The virtual master device in each of the one or more second partitions executes initial setting with respect to each of all storage devices coupled to the second partition.

Advantageous Effects of Invention

Even when a path between a processor unit and a part of the first partition of a switch is in a non-coupling state or a failure state, it is possible to perform initial setting of each storage device. Moreover, the number of couplable storage devices is not limited to the number of devices that the processor unit can use. Furthermore, since a storage device may be coupled to a second partition, the setting does not depend on increase/decrease in number of paths between the processor unit and the switch.

BRIEF DESCRIPTION OF DRAWINGS

FIG. 4 illustrates a configuration of a drive state management table.

FIG. 5 illustrates a configuration of a drive initial setting management table.

FIG. 6 illustrates a configuration of a drive configuration management table.

FIG. 7 illustrates a configuration of a path management table 146.

FIG. 8 illustrates a configuration of an address conversion table.

FIG. 9 illustrates a configuration of a command management table.

FIG. 16 illustrates a configuration of an entire address management table.

FIG. 17 illustrates a configuration of a first switch address management table.

FIG. 18 illustrates a configuration of a second switch address management table.

DESCRIPTION OF EMBODIMENTS

Hereinafter, several embodiments will be described.

In the following description, although information is sometimes described using an expression of an "xxx table," the information may be expressed by an arbitrary data structure. That is, the "xxx table" may be referred to as "xxx information" in order to show that information does not depend on a data structure. Moreover, in the following description, the configuration of each table is an example, one table may be divided into two or more tables, and all or a portion of two or more tables may be integrated into one table.

In the following description, an "interface unit" includes one or more communication interface devices. One or more communication interface devices may be one or more interface devices of the same type (for example, one or more NICs (Network Interface Cards)) and may be two or more interface devices of different types (for example, an NIC and an HBA (Host Bus Adapter)).

In the following description, a "memory unit" includes one or more memories. At least one memory of the memory unit may be a volatile memory. The memory unit is used mainly during processing of a processor unit.

In the following description, a "processor unit" includes one or more processors. At least one processor is typically a microprocessor such as a CPU (Central Processing Unit). One or more processors may be of a single core or multi-cores. The processor may include a hardware circuit that performs a part or all of the processes.

In the following description, a "host system" may be one or more physical host computers (for example, a cluster of host computers) and may include at least one virtual host computers (for example, VM (Virtual Machine)). Hereinafter, the host system will be referred to simply as a "host". A host may be a VM (for example, a server VM) operating as a host in a storage system.

In the following description, a "storage system" may be one or more physical storage apparatuses and may include at least one virtual storage apparatuses (for example, SDS (Software Defined Storage)). For example, the storage system may execute a server VM and a storage VM which is a VM operating as a storage controller. The storage VM may execute I/Os in response to an I/O (Input/Output) request from the server VM.

Moreover, in the following description, when the same types of elements are not distinguished from each other, reference symbols (or common portions in the reference symbols) may be used, whereas when the same types of elements are distinguished from each other, IDs of the elements (or the reference symbols of the elements) may be used.

Example 1

Figure 1:
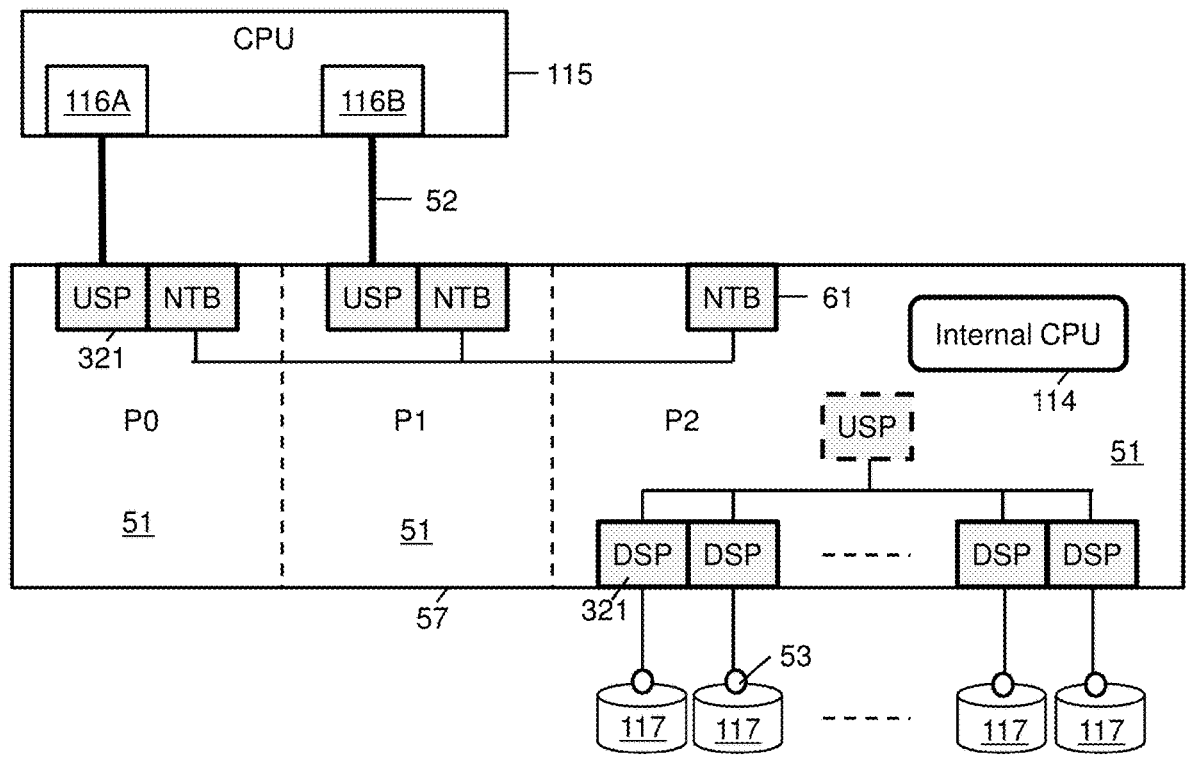
FIG. 1 illustrates an overview of a backend configuration of a storage system according to Embodiment 1.

FIG. 1 illustrates an overview of a backend configuration of a storage system according to Embodiment 1.

A CPU (an example of a processor unit) 115 includes two root complexes (an example of a plurality of master devices) 116A and 116B. Each root complex 116 is a port (hereinafter a CPU port), for example.

A multi-root PCIe switch (hereinafter PCIe-SW) 57 has a plurality of ports (hereinafter SW ports) 321. A plurality of SW ports 321 include DSP (downstream port) coupled to lower-layer devices and USP (upstream port) coupled to upper-layer devices. DSP is a port of which the attribute is downstream. USP is a port of which the attribute is upstream. A "lower-layer device" is another PCIe switch (for example, another PCIe-SW) or an endpoint (typically a drive 117), for example. A "higher-layer device" is a CPU 115, for example.

The PCIe-SW 57 is logically partitioned into a plurality of partitions (domains) 51.

At least the following configurations are adopted in the present embodiment.

(Configuration 1)

A partition for drives (hereinafter a drive partition) P2 in addition to two partitions (hereinafter CPU partitions) P0 and P1 to which two root complexes 116A and 116B included in the CPU 115 are coupled are provided in the PCIe-SW 57. The drive 117 (for example, the drive 117 only) is coupled to the drive partition P2, and at least the CPU 115 is not coupled thereto. In the present embodiment, it is assumed that the drive 117 is not coupled to the CPU partitions P0 and P1, and the drive 117 only is coupled to the drive partition P2. The root complex 116 of the CPU 115 is coupled to the USP of each of the CPU partitions P0 and P1 via the path 52. A plurality of ports (hereinafter drive ports) 53 included in each of the plurality of drives 117 are coupled to each of the plurality of DSPs of the drive partition P2.

(Configuration 2)

An NTB (Non Transparent Bridge) 61 which is an example of an address conversion function that realizes transfer between different partitions 51 is provided in the PCIe-SW 57. The NTB 61 realizes transfer between the drive partition P2 and the CPU partition P0 or P1.

(Configuration 3)

A virtual root complex is provided in the drive partition P2. In the present embodiment, the CPU 114 (hereinafter an internal CPU 114) of the PCIe-SW 57 has the function of a root complex. The internal CPU 114 executes initial setting of each drive (an endpoint of the drive partition P2). Specifically, a virtual USP is provided in the drive partition P2, and a virtual root complex (the internal CPU 114) is coupled to the USP, for example.

Figure 2:
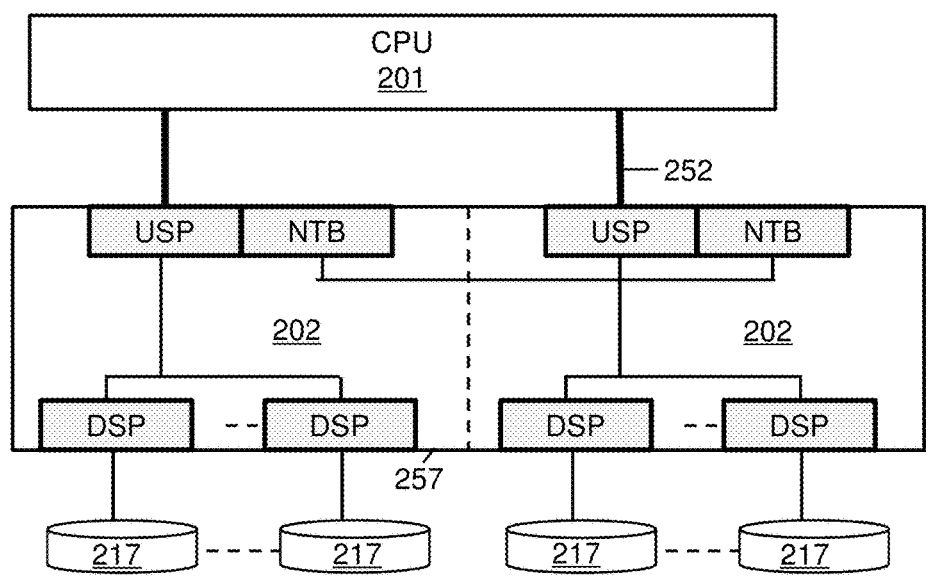
FIG. 2 illustrates an overview of a backend configuration according to a comparative example.

According to the comparative example illustrated in FIG. 2, configurations corresponding to Configurations A and B described above are adopted. Due to this, problems corresponding to Problems X to Z described above occur. That is, according to the comparative example, if a certain path 252 between the CPU 201 and the PCIe-SW 257 is in a non-coupling state or a failure state, it is not possible to perform initial setting of the drive 217 coupled to the partition 202 to which the path 252 is coupled. Moreover, according to the comparative example, even when the same number of drives 217 as the number of drives that the CPU 201 can use are coupled to the PCIe-SW 257, the CPU 201 cannot access all drives 217. Furthermore, according to the comparative example, the setting (for example, the setting related to the drive 217) of the backend configuration depends on the number of paths 252 between the CPU 201 and the PCIe-SW 257.

According to Configuration 1, the drive 117 is not coupled to the partition 51 to which the CPU 115 is coupled (the drive 117 is not disposed in a domain corresponding to a bus number visible from the CPU 115). Therefore, the CPU 115 does not use (consume) the BDF (a combination of bus number, device number, and function number) for the drive 117. As a result, it is possible to reduce the number of BDFs used by the CPU 115. Moreover, the setting of the backend configuration does not depend on the number of paths 52 between the CPU 115 and the PCIe-SW 57. In other words, it is not necessary to take a drive position which partition 51 the drive 117 is to be coupled into consideration.

According to Configuration 2, the CPU 115 can access the drive 117 coupled to the drive partition P2 via the CPU partition P0 or P1.

According to Configuration 1 (Configuration 2), since the CPU 115 is not coupled to the drive partition P2, the initial setting of the drive 117 (access to a configuration register of the drive 117) cannot be executed directly from the CPU 115.

According to Configuration 3, the internal CPU 114 of the PCIe-SW 57 can perform the initial setting (access to the configuration register of the drive 117) of the drive 117 as a root complex.

Hereafter, the present embodiment will be described in detail. The two CPU partitions P0 and P1 are examples of a plurality of first partitions. One drive partition P2 is an example of one or more second partitions. The number of CPU partitions may be the same as the number of root complexes 116 included in the CPU 115.

Figure 3:
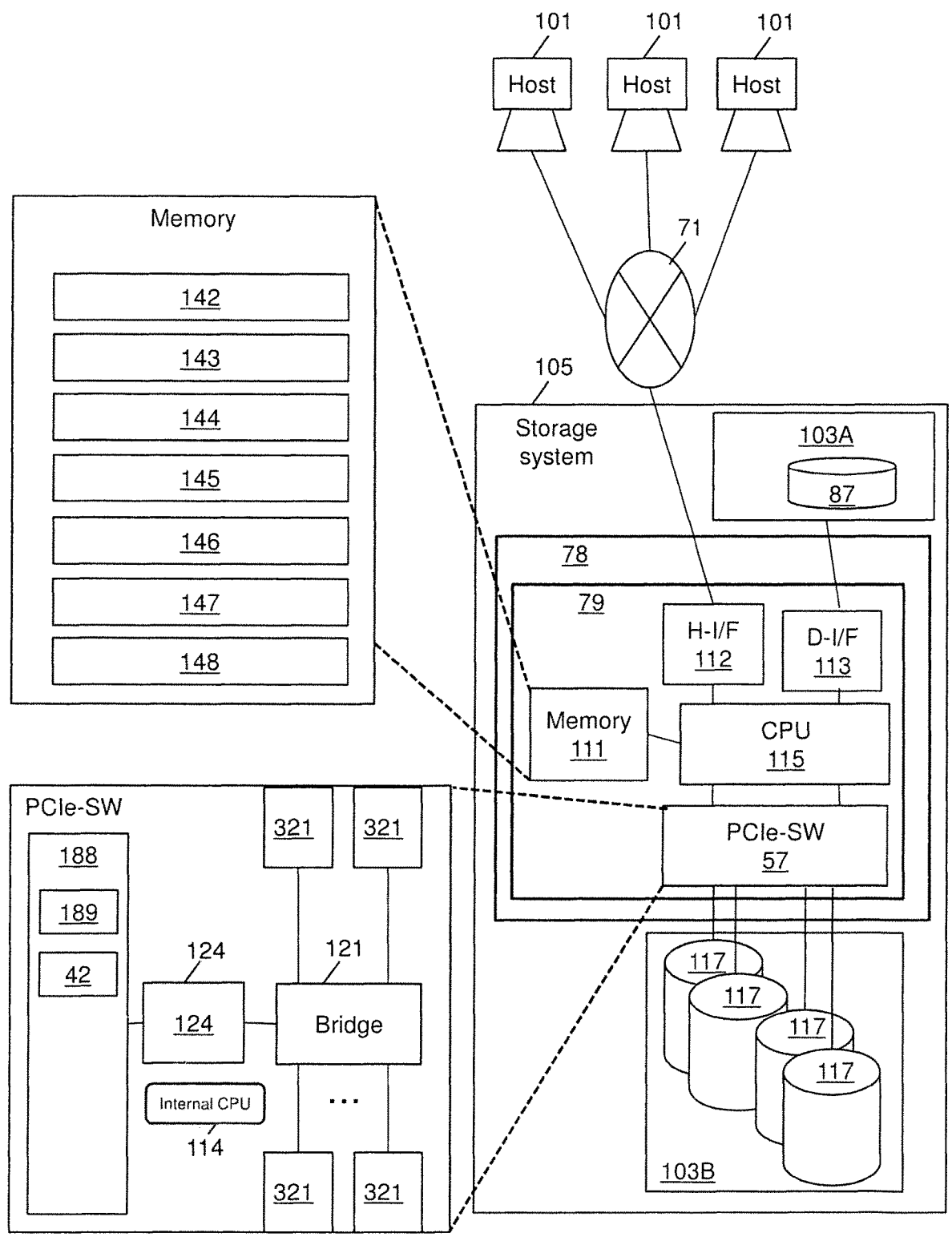
FIG. 3 illustrates a configuration of an information system including the storage system according to Embodiment 1.

FIG. 3 illustrates a configuration of an information system including the storage system according to Embodiment 1.

The information system includes one or a plurality of host systems (hereinafter hosts) 101 and a storage system 105. The host 101 and the storage system 105 are coupled to a communication network 71 (for example, a SAN (Storage Area Network) or a LAN (Local Area Network)).

The host 101 transmits an I/O (Input/Output) request to the storage system 105. The I/O request includes I/O destination information indicating the location of an I/O destination. The I/O destination information includes a LUN (Logical Unit Number) of an LU (Logical Unit) of the I/O destination and an LBA (Logical Block Address) of an area in the LU. The LU is a logical volume (a logical storage device) provided from the storage system 105. A logical area of the I/O destination is specified on the basis of the I/O destination information and the drive 117 based on the logical area is specified.

The storage system 105 includes a controller box 78 and one or more drive boxes 103 coupled to the controller box 78.

The controller box 78 has a storage controller 79. The storage controller 79 has a plurality of communication interface devices (an example of an interface unit), a memory 111 (an example of a memory unit), the PCIe-SW 57 (an example of a switch), and the CPU 115 (an example of a processor unit) coupled to these components.

The plurality of communication interface devices include one or more H-I/Fs 112 (for example, Fibre Channel, iSCSI, FCoE, or PCIe devices) which are one or more communication interface devices for communicating with a plurality of hosts 101. The plurality of communication interface devices may include one or more D-I/Fs 113 (for example, a SAS controller or a PCIe switch) which are one or more communication interface devices for communicating with the drives 87 in the drive box 103A. The drives 87 in the drive box 103A may be NVMe-SSDs, PCIe drives of other types, SSDs (for example, SAS-SSDs) of other types, and drives (for example, HDD (Hard Disk Drive)) of other types.

The memory 111 stores one or more computer programs executed by the CPU 115 and information referred to or updated by the CPU 115. One or more computer programs include a micro program such as firmware 142, for example. Information is a plurality of tables, for example. The plurality of tables include a drive mounting state management table 143, a drive setting state management table 144, a drive initial setting management table 145, a path management table 146, an address conversion table 147, and a command management table 148. Moreover, a cache area in which user data which is data input and output with respect to the drive 117 (or 87) in response to an I/O request from the host 101 is temporarily stored is provided in the memory 111.

The PCIe-SW 57 has a plurality of SW ports 321, a bridge 121, an internal CPU 114 (an example of an internal processor unit), and an internal memory 188 (an example of an internal memory unit).

The plurality of SW ports 321 are coupled to the bridge 121. The internal memory 188 and the bridge 121 are coupled to the internal CPU 114. Communication between the internal CPU 114 and a device coupled to the SW port 321 is performed via the bridge 121.

The internal memory 188 stores one or more computer programs executed by the internal CPU 114 and information referred to and updated by the internal CPU 114. One or more computer programs include a micro program such as the firmware 189, for example. The information is one or more tables (for example, a message notification management table 42 to be described later), for example.

One or more drive boxes 103 include at least a drive box 103B having a plurality of drives 117 coupled to the PCIe-SW 57. The drives 117 are NVMe-SSDs. The drives 117 may be PCIe drives of other types. One or more drive boxes 103 may further include the drive box 103A described above.

FIG. 4 illustrates a configuration of the drive mounting state management table 143.

The drive mounting state management table 143 is a table that stores information related to a mounting state of each drive 117. The drive mounting state management table 143 has entries for respective DSP in the drive partition P2. Each entry stores information such as Drive #401, Mounting state 402, and Link state 403.

Drive #401 is a drive number managed by a program of the storage system 105.

Mounting state 402 indicates whether the drive 117 is mounted (physically coupled) on the DSP. As the value of Mounting state 402, "1" means a mounting state and "0" means a non-mounting state.

Link state 403 indicates whether the drive 117 is in a link-up state (a communicable state) with respect to a DSP. As the value of Link state 403, "1" means a link-up state and "0" means a link-down state (a non-communicable state).

FIG. 5 illustrates a configuration of the drive setting state management table 144.

The drive setting state management table 144 is a table that stores information on a setting state of each drive 117. The drive setting state management table 144 has entries for respective DSPs in the drive partition P2. Each entry stores information such as Drive #501, Completion state 502, and Result state 503.

Drive #501 is a drive number managed by a program of the storage system 105.

Completion state 502 indicates whether an initial setting for the drive 117 is completed. As the value of Completion state 502, "1" means a completed state and "0" means a non-completed state.

Result state 503 indicates whether the result of completing the initial setting for the drive 117 is success or not. As the value of Result state 503, "1" means success and "0" means fail.

FIG. 6 illustrates a configuration of the drive initial setting management table 145.

The drive initial setting management table 145 is a table that stores information set to a configuration register of each drive 117. The drive initial setting management table 145 has entries for respective DSPs in the drive partition P2. Each entry stores information such as Drive #601, Bus #602, Device #603, Function #604, Base address register 605, and MSI (Message Signaled Interrupt) table register 606.

Drive #601 is a drive number managed by a program of the storage system 105.

Bus #602 is a bus number among BDFs. Device #603 is a device number among BDFs. Function #604 is a function number among BDFs. The BDF is not BDF among the BDFs that the CPU 115 can use but is BDF among the BDFs that the internal CPU 114 can use and is set in the configuration register of the drive 117.

The base address register 605 indicates an address (an address in a memory map space of the CPU 115) corresponding to the drive 117. The configuration register of the drive 117 may be a storage area (for example, a register of the drive port 53 (see FIG. 1)) of the drive 117, for example.

The MSI table register 606 indicates an output destination address (for example, an address of an area in the memory 111) of a message (for example, failure information related to a failure in the drive 117) corresponding to the drive 117.

FIG. 7 illustrates a configuration of the path management table 146.

The path management table 146 is a table that stores information related to paths between the CPU 115 and the PCIe-SW 57. The path management table 146 has entries for respective paths 52. Each entry stores information such as Path #701, Data transfer amount 702, Link state 703, and Weight 704.

Path #701 is an identification number of the path 52. Data transfer amount 702 is an example of a load of the path 52 and indicates the amount of data (for example, the amount of data transferred per unit time) transferred via the path 52. Link state 703 indicates a link state of the path 52. As the value of Link state 703, "1" means a normal state (a coupling state) and "0" means an abnormal state (a non-coupling state or a failure state). Weight 704 indicates a weight of the path 52.

FIG. 8 illustrates a configuration of the address conversion table 147.

The address conversion table 147 stores information related to a relation between addresses before and after conversion. The address conversion table 147 has entries for respective I/O commands issued by the CPU 115 after the initial setting of the drive 117 is processed. Each entry stores information such as Tag #801, Path #802, Actual memory address 803, and Command designation memory address 804. Although an I/O command is adopted as a management target command issued by the CPU 115 after the drive initial setting process is performed in the present embodiment, other types of commands may be used as a management target in addition to the I/O command.

Tag #801 is an identification number (substantially, an identification number of an I/O command) of a tag correlated with the I/O command. Path #802 is an identification number of a path 52 via which the I/O command passes. Actual memory address 803 indicates an address before address conversion (specifically, an address of an area (an area in a memory) in which I/O target user data corresponding to the I/O command is stored). Command designation memory address 804 indicates an address after address conversion (specifically, a memory address designated by the I/O command (for example, a destination drive corresponding address in a memory map space of the CPU 115)).

FIG. 9 illustrates a configuration of the command management table 148.

The command management table 148 is a table that stores information related to the I/O command. The command management table 148 has entries for respective I/O commands issued by the CPU 115 after a drive initial setting process is performed. Each entry stores information such as Tag #901, Drive #902, Length 903, Command designation memory address 904, and Drive address 905.

Tag #901 is an identification number (substantially, an identification number of an I/O command) of a tag correlated with an I/O command. Drive #902 is an identification number of an I/O destination drive 117 corresponding to the I/O command. Length 903 indicates the data length of an I/O target corresponding to the I/O command. Command designation memory address 904 indicates a memory address designated by the I/O command. Drive address 905 indicates an address (for example, LBA (Logical Block Address)) of an I/O destination area in the I/O destination drive 117.

Hereinafter, some processes performed in the present embodiment will be described.

<Drive Initial Setting>

Figure 10:
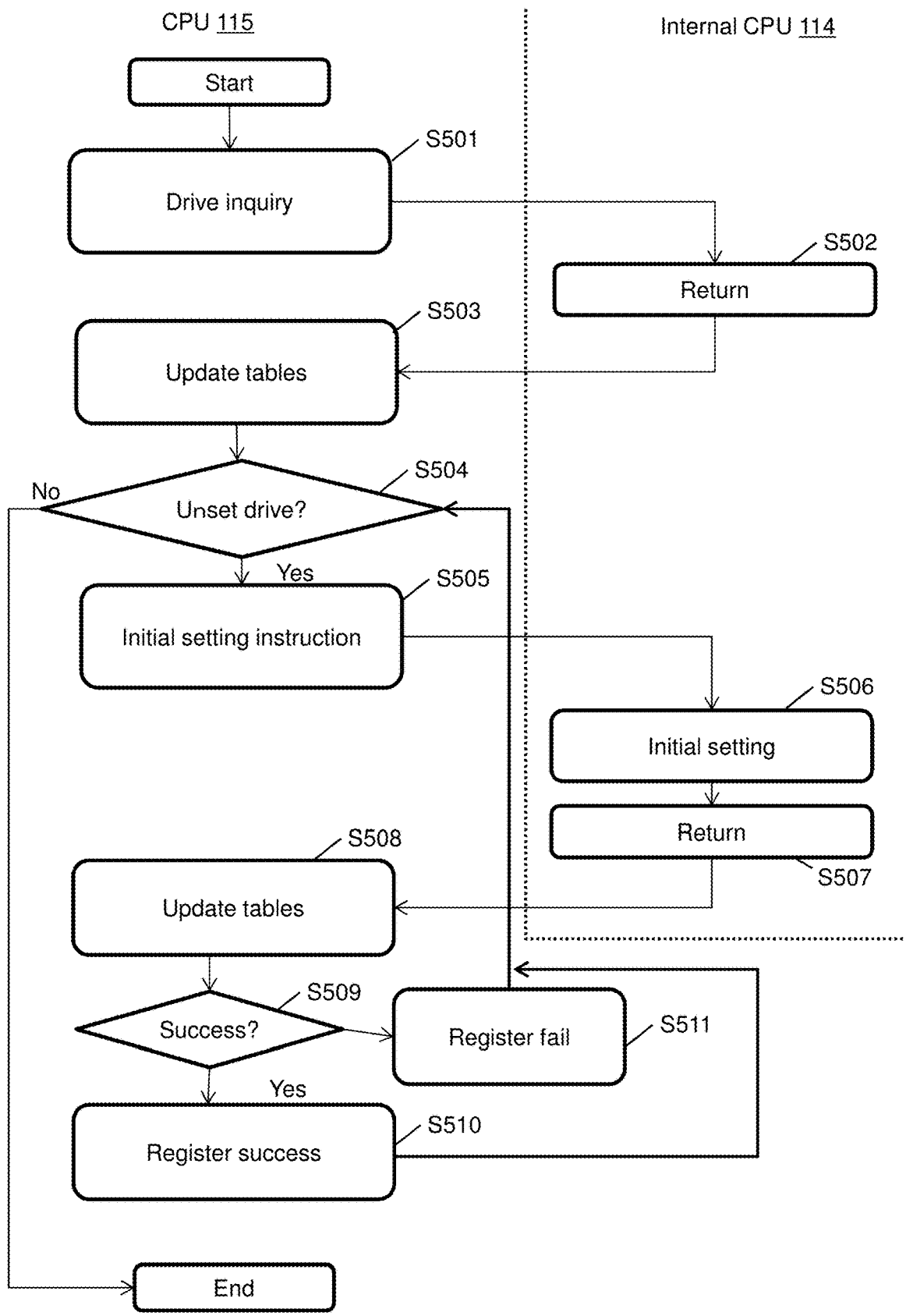
FIG. 10 illustrates the flow of a drive initial setting process.

FIG. 10 illustrates the flow of a drive initial setting process.

The CPU 115 (the firmware 142) transmits a drive inquiry which is an inquiry about the state of the drive 117 to the PCIe-SW 57 (S501).

In response to the drive inquiry, the internal CPU 114 (the firmware 142) returns the drive information (Drive # and information indicating a mounting or non-mounting state, a link-up or link-down state, a setting completion or non-completion state, and a setting success or fail state) for respective DSPs in the drive partition P2 to the CPU 115 (S502).

The CPU 115 (the firmware 142) registers the information (the drive information for respective DSPs in the drive partition P2) from the internal CPU 114 in the drive mounting state management table 143 and the drive setting state management table 144 (S503).

The CPU 115 (the firmware 142) determines whether there is one or more non-set drives 117 on the basis of the tables 143 and 144 (S504). The "non-set drive 117" is a drive 117 of which the mounting state 402 is "1", the link state 403 is "1", and the completion state 502 is "0". The "non-set drive 117" may be a drive 117 of which the result state 503 is "0". This is to retry the initial setting for the drive 117 in which the initial setting has failed.

When a determination result in S504 is true (S504: Yes), the CPU 115 (the firmware 142) transmits an initial setting instruction for a target drive 117 which is one drive 117 selected from the one or more non-set drives 117 to the PCIe-SW 57. The initial setting instruction is correlated with Drive # of the target drive 117.

In response to the initial setting instruction, the internal CPU 114 (the firmware 189) executes initial setting for the target drive 117 (S506). Specifically, for example, the internal CPU 114 (the firmware 189) sets information including the MSI table register, the Base address register, and the BDF indicated by the drive initial setting management table 145 defined by the CPU 115 (the firmware 142) to the configuration register of the target drive 117.

The internal CPU 114 (the firmware 189) returns the execution result to the CPU 115 (S507). The execution result includes the set information (BDF, Base address register, and MSI table register), information indicating whether the initial setting has succeeded or failed, and Drive # of the target drive 117.

The CPU 115 (the firmware 142) registers the information (information including Drive #, BDF, Base address register, and MSI table register) included in the returned execution result in the entry (the entry in the drive initial setting management table 145) corresponding to the target drive (S508).

The CPU 115 (the firmware 142) determines whether information indicating success is included in the returned execution result (S509).

When the determination result in S509 is true (S509: Yes), the CPU 115 (the firmware 142) registers the completion state 502 of "1" and the result state 503 of "1" in the entry (the entry in the drive setting state management table 144) corresponding to the target drive 117 (S510). After that, the process returns to S504.

When the determination result in S509 is false (S509: No), the CPU 115 (the firmware 142) registers the completion state 502 of "1" and the result state 503 of "0" in the entry (the entry in the drive setting state management table 144) corresponding to the target drive 117 (S511). After that, the process returns to S504.

As described above, in the drive initial setting process, the BDF usable by the CPU 115 is not used (consumed) for the initial setting of the drive 117, but the BDF usable by the internal CPU 114 is used for the initial setting of the drive 117. The CPU 115 can access the configuration register of the drive 117 in which the initial setting is completed (has succeeded) using a base address (a base address that the internal CPU 114 uses) corresponding to the drive 117.

<Failure Information Notification>

The CPU 115 is not coupled to the drive partition P2. In the drive partition P2, the internal CPU 114 is a virtual root complex (for example, a root complex). Therefore, when the drive 117 has detected a failure in the drive 117, failure information (an example of a message) is issued to the internal CPU 114 which is a root complex. However, the failure information does not arrive at the CPU 115 which is not coupled to the drive partition P2 (Problem 1). This is because the drive 117 is not disposed in a domain of a bus number visible from the CPU 115.

As a method for solving Problem 1, a method in which the internal CPU 114 notifies the CPU 115 of a failure using an interrupt when the failure information from the drive 117 is detected may be used. However, according to this method, since the processing of the CPU 115 having received the interrupt is suspended, the failure in one drive 117 may have an influence on the entire storage system 105 (Problem 2). This is because other devices such as the H-I/F 112 as well as the PCIe-SW 57 are also coupled to the CPU 115.

As a method for solving Problem 2, a method in which the CPU 115 issues a failure inquiry (an inquiry about whether a failure has occurred in any one of drives 117) periodically to the internal CPU 114 of the PCIe-SW 57. However, since the failure inquiry passes via the path 52 between the CPU 115 and the PCIe-SW 57, the performance of I/Os with respect to the drive 117 may decrease.

Figure 11:
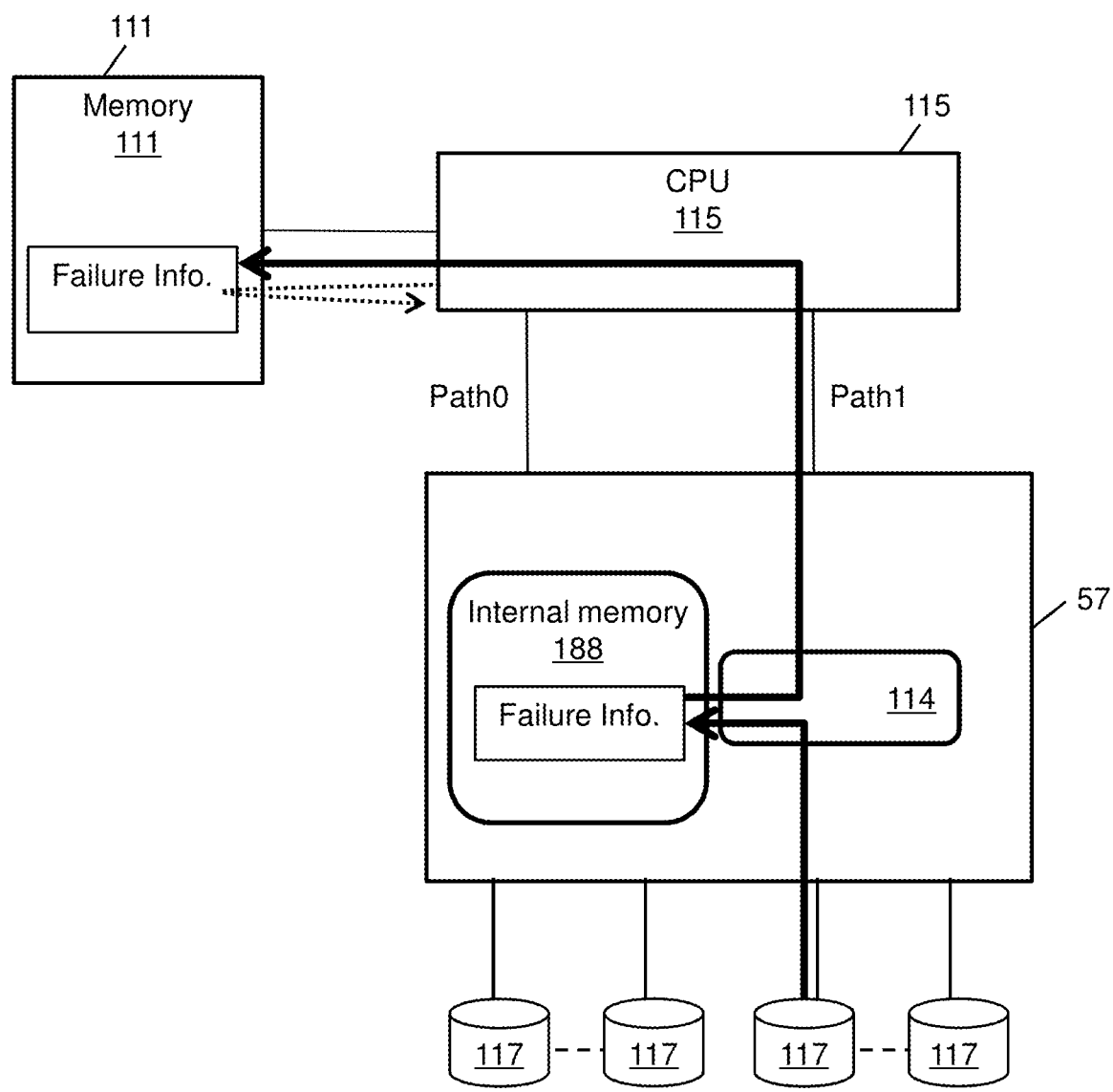
FIG. 11 illustrates an overview of an obstacle information notification.

Therefore, in the present embodiment, as illustrated in FIG. 11, the failure information from the drive 117 is stored in the internal memory 188, and the failure information is transferred from the internal memory 188 to the memory 111 and is stored in the memory 111 by the internal CPU 114 (or DMA (Direct Memory Access)). The CPU 115 accesses the memory 111 instead of the internal memory 188 periodically in order to check the presence of failure information. Due to this, since the path 52 is not used for checking the presence of failure information, it is possible to avoid decrease in the performance of I/Os with respect to the drive 117.

Hereinafter, the flow of processes performed by the CPU 115 and the internal CPU 114 in relation to notification of failure information will be described. The failure information includes information indicating the location (for example, Drive #) where a failure has occurred and information indicating the details of the failure.

Figure 12:
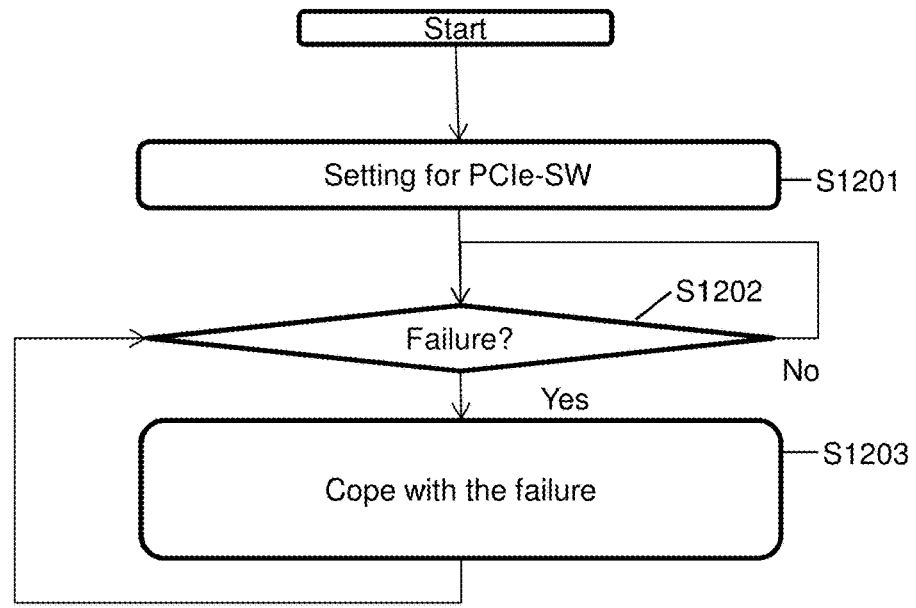
FIG. 12 illustrates the flow of a process performed by a CPU (firmware) in relation to the obstacle information notification.

FIG. 12 illustrates the flow of processes performed by the CPU 115 (the firmware 142) in relation to notification of failure information.

The message notification management table 42 is stored in the internal memory 188. The message notification management table 42 is a table that stores information related to an output destination of a message such as failure information for respective drives 117 (respective DSPs). The CPU 115 sets information of each drive 117 in the message notification management table 42 in the memory of the PCIe-SW 57 (S1201). The information of each drive 117 includes Drive #(an identification number of the drive 117), MSI table register (an address of a transfer destination area (an area in a memory) of the failure information from the drive 117), and Path #(path # of a path used for transferring the failure information). If the path used for notification of a message is distributed equivalently to a plurality of drives 117, it can be anticipated that concentration of load on a specific path for notification of a message is avoided.

The CPU 115 checks (refers to) each area (an area indicated by MSI table register 606) of the memory 111 periodically in order to detect whether the message (for example, failure information) is stored in the area (S1202).

When it is detected that the failure information is stored in any one of the areas (S1202: Yes), the CPU 115 acquires the failure information from the area and executes processing for coping with the failure on the basis of the failure information (S1203). For example, the CPU 115 suspends I/Os with respect to the failure drive 117 which is the drive 117 specified on the basis of the failure information and blocks the failure drive 117.

Figure 13:
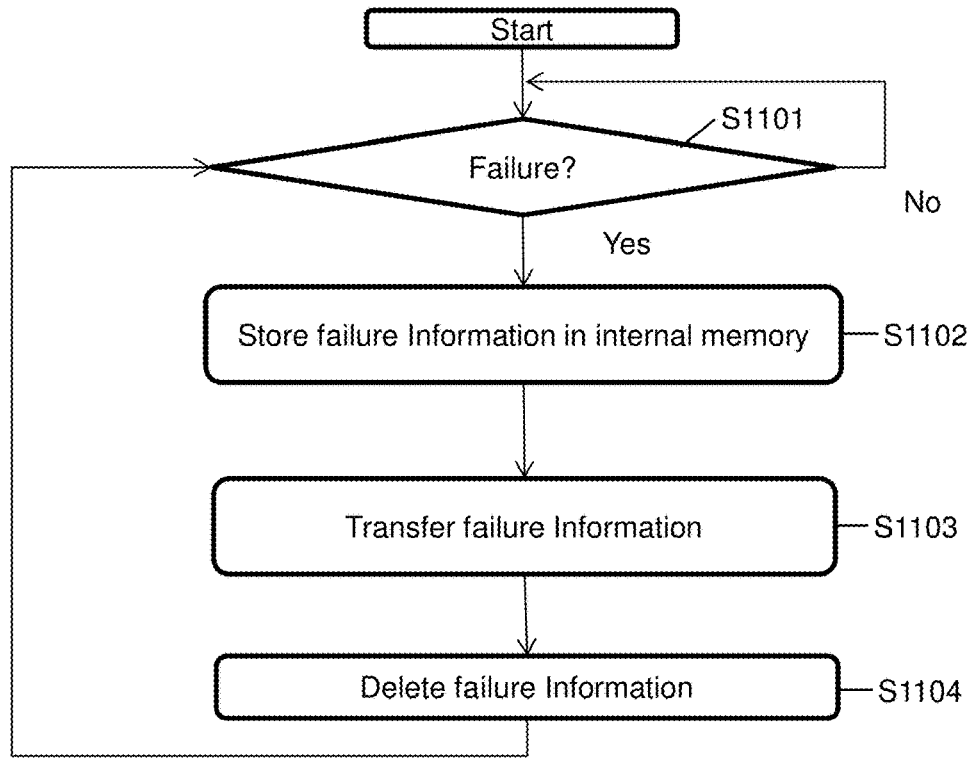
FIG. 13 illustrates the flow of a process performed by an internal CPU (firmware) in relation to the obstacle information notification.

FIG. 13 illustrates the flow of processes performed by the internal CPU 114 (the firmware 189) in relation to notification of failure information.

When a failure in any one of drives 117 is detected (S1101: Yes), the internal CPU 114 stores the failure information from the drive 117 in the internal memory 188 (S1102). The failure information in the internal memory 188 is transferred from the internal memory 188 to an area (an area in the memory 111) indicated by the MSI table register corresponding to the failure drive 117 via the path 52 corresponding to the failure drive 117 on the basis of the message notification management table 42 by the internal CPU 114 (or DMA) (S1103). The internal CPU 114 deletes the transferred failure information from the internal memory 188 (S1104).

<Path Selection>

A plurality of paths 52 are present between the CPU 115 and the respective drives 117. It is necessary to determine a path via which the I/O command passes on the basis of a memory address designated by the I/O command to the drive 117.

Therefore, in the present embodiment, the relation between a memory address and a path designated by the I/O command is determined on the basis of the path management table 146 (at least one of the data transfer amount 702 and the link state 703).

Hereinafter, a path selection process will be described. The CPU 115 (the firmware 142) checks the data transfer amount and the link state of the path periodically and registers the checking result in the path management table 146.

Figure 14:
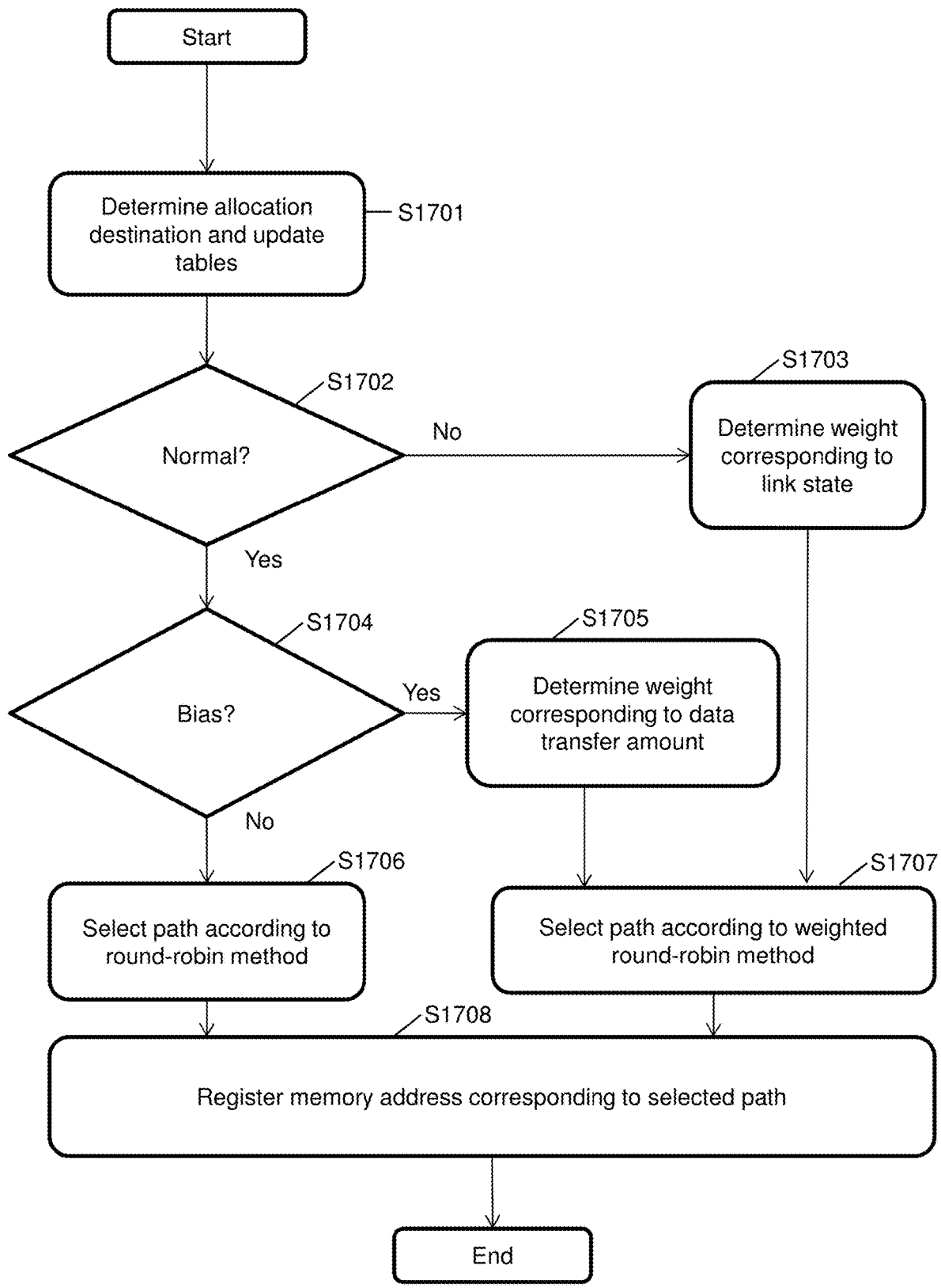
FIG. 14 illustrates the flow of a path selection process.

FIG. 14 illustrates the flow of the path selection process.

The CPU 115 (the firmware 142) determines an allocation destination area (an area in the memory 111) of the user data corresponding to an I/O request (S1701). The CPU 115 (the firmware 142) registers Actual memory address 803 indicating the allocation destination area and Tag #801 of the I/O command for I/Os of the user data in an entry (an entry corresponding to the I/O command) in the address conversion table 147. Moreover, the CPU 115 (the firmware 142) registers Tag #901 of the I/O command, Drive #902 of the I/O destination drive 117 of the user data, Length 903 indicating the data length of the user data, and Drive address 905 of the I/O destination of the user data in an entry (an entry corresponding to the I/O command) in the command management table 148.

The CPU 115 (the firmware 142) determines whether the link state 703 of each path is "1" (normal) (S1702).

When the determination result in S1702 is false (when the link state 703 of at least one path is "0") (S1702: No), the CPU 115 (the firmware 142) sets a weight higher than the link state 703 of "0" in the path management table 146 as the weight for the path of the link state 703 of "1" (S1703). In this case, the CPU 115 (the firmware 142) may adjust the weight of the path corresponding to the link state 703 of "1" on the basis of the data transfer amounts 702 of the respective paths. For example, the weight may be set such that the higher the data transfer amount 702, the higher is the weight. Subsequently to S1703, the CPU 115 (the firmware 142) determines the path according to a weighted round-robin method, that is, the path is determined on the basis of the proportion of the weights of paths (S1707). For example, when the weight ratio of Paths 0 and 1 is 1:2, Path 1 is selected twice and then Path 0 is selected once. Subsequently to S1707, the CPU 115 (the firmware 142) determines a memory address corresponding to the selected path and updates the address conversion table 147 and the command management table 148 (S1708). That is, the CPU 115 (the firmware 142) registers Path #802 of the selected path and Command designation memory address 804 which is a memory address corresponding to the selected path in an entry (an entry corresponding to the I/O command) in the address conversion table 147. Moreover, the CPU 115 (the firmware 142) registers Command designation memory address 904 which is a memory address corresponding to the selected path in an entry (an entry corresponding to the I/O command) in the command management table 148.

When the determination result in S1702 is true (when the link states 703 of all paths are "1") (S1702: Yes), the CPU 115 (the firmware 142) determines whether there is a bias in the data transfer amount 702 for the paths of which the link state 703 is "1" (S1704). The "bias" mentioned herein may mean that a difference between the largest data transfer amount 702 and the smallest data transfer amount 702 in the path management table 146 is equal to or smaller than a predetermined value, for example.

When the determination result in S1704 is false (S1704: No), the CPU 115 (the firmware 142) sets a relatively high weight as the weight of a path of which the data transfer amount 702 (the load of the path) is relatively low and sets a relatively low weight as the weight of a path of which the data transfer amount 702 is relatively high in the path management table 146 (S1705). Subsequently to S1705, S1707 and S1708 are performed.

When the determination result in S1704 is true (S1704: Yes), the CPU 115 (the firmware 142) determines a path according to a round-robin method (S1706). Subsequently to S1706, S1708 is performed.

Example 2

Embodiment 2 will be described. A difference from Embodiment 1 will be mainly described, and description of features common to Embodiment 1 will be omitted or simplified.

Figure 15:
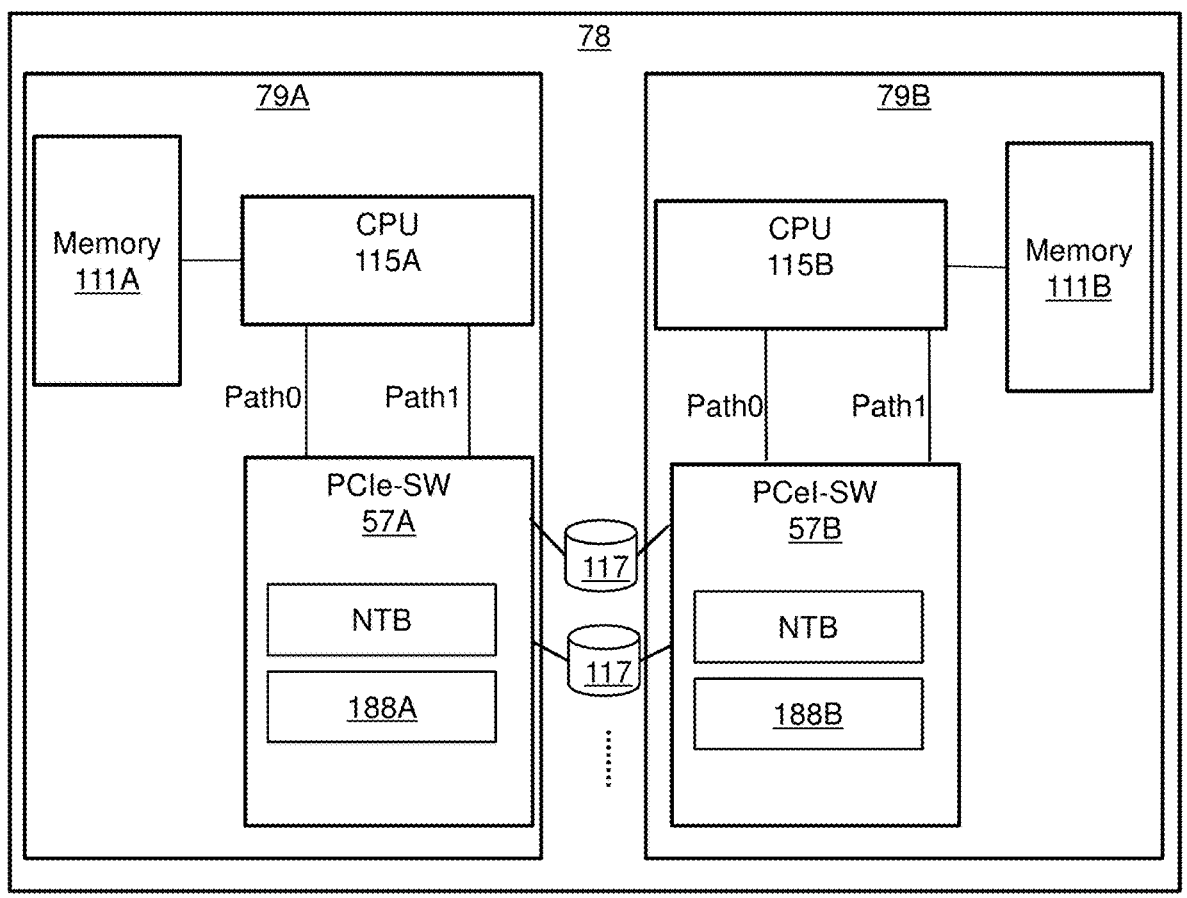
FIG. 15 illustrates a portion of a configuration of a controller box according to Embodiment 2.

FIG. 15 illustrates a portion of a configuration of a controller box according to Embodiment 2.

A controller box 78 has first and second storage controllers 79A and 79B as duplex storage controllers 79. Therefore, the PCIe-SW 57 is also duplexed. A plurality of drives 117 are coupled to the first and second PCIe-SWs 57A and 57B.

An address range used by a first CPU 115A in a first memory 111A and an address range used by a second CPU 115B in a second memory 111B overlap at least partially.

Specifically, for example, the first and second CPUs 115A and 115B can store user data and tables in the same address range of the first and second memories 111A and 111B.

In the first and second PCIe-SWs 57A and 57B, although each drive 117 is not coupled to the CPU partition to which the CPU 115 is coupled, the CPU 115, the memory 111, the PCIe-SW 57, and the drive 117 can communicate with each other via the same communication interface such as PCIe unlike SAS (Serial Attached SCSI) or FC (Fibre Channel).

If a certain drive 117 is congested, an unauthorized access to the same address of both memories 111A and 111B occurs due to the influence of congestion of the drive 117, and the data (at least a portion of the user data or at least a portion of one or more tables) in both areas indicated by the same address may be deleted. As a result, a system-down may occur.

NTB is provided in each PCIe-SW 57. NTB performs address conversion. Due to this, if an access destination address to a memory is an address (an address outside a support range) outside an address range usable by the NTB, it is possible to prevent occurrence of an unauthorized access to a memory resulting from congestion of the drive 117. However, when the access destination address to a memory is within a support range, it is not possible to prevent an unauthorized access.

In the present embodiment, a first address range supported by the first PCIe-SW 57A is different from a second address range supported by the second PCIe-SW 57B. Preferably, the first address range does not overlap the second address range at any point. Due to this, even if the access destination address to the first memory 111A is within the first address range, the same access destination address to the second memory 111B is outside the second address range. As a result, it is possible to decrease the possibility of occurrence of a system-down.

Specifically, the present embodiment is configured as follows, for example.

The first and second memories 111A and 111B coupled to the first and second CPUs 115A and 115B, respectively, store an entire address management table 1600 illustrated in FIG. 16. The entire address management table 1600 has entries for respective paths. Each entry stores information such as CTL #1601, Path #1602, Start address 1603, and Size 1604. CTL #1601 is an identification number of the storage controller 79A or 79B including the path. Path #1602 is an identification number of the path. Start address 1603 is a start address (memory address) of an address range corresponding to the path. Size 1604 is the size of the address range. The address range is defined by Start address 1603 and Size 1604.

The internal memory 188A of the first PCIe-SW 57A stores a first switch address management table 1700A illustrated in FIG. 17. The first switch address management table 1700A has entries for respective paths coupled to the first PCIe-SW 57A. Each entry stores information such as Path #1701A, Start address 1702A, and Size 1703A. Path #1701A is an identification number of the path. Start address 1702A is a start address (memory address) of an address range corresponding to the path. Size 1703A is the size of the address range. The address range supported by the first PCIe-SW 57A is defined by Start address 1702A and Size 1703A.

The memory 188B of the second PCIe-SW 57B stores a second switch address management table 1700B illustrated in FIG. 18. A configuration of the second switch address management table 1700B is the same as the configuration of the first switch address management table 1700A. That is, the second switch address management table 1700B has entries for respective paths coupled to the second PCIe-SW 57B, and each entry stores information such as Path #1701B, Start address 1702B, and Size 1703B.

According to the tables 1600, 1700A, and 1700B illustrated in FIGS. 16 to 18, the first address range (the address range of an area in the memory 111A) supported by the first PCIe-SW 57A is different from the second address range (the address range of an area in the memory 111B) supported by the second PCIe-SW 57B. Due to this, as described above, even if the access destination address to the first memory 111A is within the first address range, the same access destination address to the second memory 111B is outside the second address range. As a result, it is possible to decrease the possibility of occurrence of a system-down.

While the embodiment of the present invention has been described, the embodiment is an example for describing the present invention and it should be noted that the scope of the present invention is not limited to the above-described configuration. The present invention can be implemented in various other embodiments. For example, the present invention can be applied even when other types of switch that relay communication according to a communication interface in which the number of master devices that can be present in the same domain is defined is adopted instead of the PCIe-SW 57.

REFERENCE SIGNS LIST

105 Storage system

The invention claimed is:

1. A storage system comprising:
a switch that relays communication according to a communication interface in which the number of master devices that can be present in the same partition is defined;
a plurality of storage devices coupled to the switch;
a memory unit including one or more memories; and
a processor unit which is one or more processors coupled to the memory unit and the switch and has a plurality of master devices, wherein
the switch is logically partitioned into a plurality of partitions,
the plurality of partitions include a plurality of first partitions and one or more second partitions,
the plurality of master devices of the processor unit are coupled to the plurality of first partitions via a plurality of paths, and the plurality of storage devices are not coupled to the plurality of first partitions,
the plurality of storage devices are coupled to the one or more second partitions, and the processor unit is not coupled to the one or more second partitions,
the switch has an address conversion function which is a function of enabling transfer between different partitions,
a virtual master device is provided in each of the one or more second partitions, and
the virtual master device in each of the one or more second partitions executes initial setting with respect to each of all storage devices coupled to the second partition.

2. The storage system according to claim 1, wherein
the switch has an internal processor unit which is one or more processors, and
a virtual master device in each of the one or more second partitions is the internal processor unit.

3. The storage system according to claim 1, wherein
the switch manages a plurality of message output destination addresses respectively corresponding to the plurality of storage devices,
each of the plurality of message output destination addresses is an address of an output destination area of a message from a storage device corresponding to the address in the memory unit,
a virtual master device is configured to, when a virtual master device of each of the one or more second partitions detects a message from any one of the storage devices coupled to the second partition, transfer the message to a message output destination address respectively corresponding to a storage device that has output the message among the plurality of message output destination addresses, and
the processor unit is configured to check each of a plurality of areas respectively corresponding to the plurality of message output destination addresses in the memory unit in order to detect whether a message is stored in the area periodically.

4. The storage system according to claim 1, wherein
the processor unit is configured to select, when an I/O command for data is transmitted to any one of the plurality of storage devices, a command path which is a path via which the I/O command passes according to a path weight determined for the plurality of paths on the basis of at least one of a link state of each of the plurality of paths and a load of the plurality of paths.

5. The storage system according to claim 1, wherein
the switch, the memory unit, and the processor unit each are duplexed,
the plurality of storage devices are coupled to both first and second switches which are duplexed switches,
first and second processor units which are duplexed processor units are coupled to the first and second switches, respectively,
first and second memory units which are duplexed memory units are coupled to the first and second processor units, respectively,
an address range used by the first processor unit in the first memory unit and an address range used by the second processor unit in the second memory unit overlap at least partially with each other, and
an address range supported by the first switch in the first memory unit and an address range supported by the second switch in the second memory unit are different from each other.

6. The storage system according to claim 1, wherein
the communication interface is PCIe (PCI-Express),
the switch is a PCIe switch conforming to multi-roots,
the master device is a root complex,
the virtual master device is a virtual root complex,
the address conversion function is NTB (Non-Transparent Bridge), and
the initial setting is setting corresponding to a configuration access.

7. The storage system according to claim 1, wherein
the switch manages a plurality of message output destination addresses respectively corresponding to the plurality of storage devices,
each of the plurality of message output destination addresses is an address of an output destination area of a message from a storage device corresponding to the address in the memory unit, and
a virtual master device is configured to, when a virtual master device of each of the one or more second partitions detects a message from any one of the storage devices coupled to the second partition, transfer the message to a message output destination address respectively corresponding to a storage device that has output the message among the plurality of message output destination addresses.

8. The storage system according to claim 2, wherein
in initial setting of each of all storage devices coupled to each of the one or more second partitions, the internal processor unit is configured to use a bus number that the internal processor unit can use.

9. The storage system according to claim 3, wherein
the message is failure information which is information on a failure in the storage device.

10. The storage system according to claim 3, wherein
the switch manages a path used for outputting the message among the plurality of paths to each of the plurality of storage devices in addition to the message output destination address, and
the virtual master device is configured to output the detected message via a path corresponding to a storage device that has output the message for each of the one or more second partitions.

11. The storage system according to claim 4, wherein
the processor unit is configured to select, when there is at least one path in a non-coupling state among the plurality of paths, the command path according to a path weight determined for the plurality of paths on the basis of a link state of each of the plurality of paths, and
the processor unit is configured to select, when there is a bias in the load of the plurality of paths, the command path according to a path weight determined for the plurality of paths on the basis of a load of the plurality of paths.

12. The storage system according to claim 6, wherein
the plurality of storage devices are a plurality of NVMe-SSDs.

13. A backend construction method for a storage system, the storage system comprising:
a switch that relays communication according to a communication interface in which the number of master devices that can be present in the same partition is defined;
a plurality of storage devices coupled to the switch;
a memory unit including one or more memories; and
a processor unit which is one or more processors coupled to the memory unit and the switch and has a plurality of master devices, wherein
the construction method comprising:
logically partitioning the switch into a plurality of partitions including a plurality of first partitions and one or more second partitions;
coupling the plurality of master devices of the processor unit to the plurality of first partitions via a plurality of paths without coupling the plurality of storage devices to the plurality of first partitions,
coupling the plurality of storage devices to the one or more second partitions without coupling the processor unit to the one or more second partitions,
allowing the switch to have an address conversion function which is a function of enabling transfer between different partitions,
providing a virtual master device in each of the one or more second partitions, and allowing the virtual master device in each of the one or more second partitions to execute initial setting with respect to each of all storage devices coupled to the second partition.

\* \* \* \* \*